US010236480B2

(12) United States Patent
Fallourd

(10) Patent No.: US 10,236,480 B2
(45) Date of Patent: *Mar. 19, 2019

(54) ENCAPSULATED MICROBATTERY HAVING TERMINAL CONNECTED TO ACTIVE LAYER THROUGH A VIA

(71) Applicant: STMicroelectronics (Tours) SAS, Tours (FR)

(72) Inventor: Ludovic Fallourd, Louans (FR)

(73) Assignee: STMicroelectronics (Tours) SAS, Tours (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,099

(22) Filed: Jul. 10, 2018

(65) Prior Publication Data

US 2018/0331332 A1     Nov. 15, 2018

Related U.S. Application Data

(63) Continuation of application No. 15/260,008, filed on Sep. 8, 2016, now Pat. No. 10,044,009.

(51) Int. Cl.
| | | |
|---|---|---|
| *H01M 2/04* | (2006.01) | |
| *H01M 2/06* | (2006.01) | |
| *H01M 2/20* | (2006.01) | |
| *H01M 10/04* | (2006.01) | |
| *H01M 2/30* | (2006.01) | |
| *H01M 2/10* | (2006.01) | |

(52) U.S. Cl.
CPC ............ *H01M 2/06* (2013.01); *H01M 2/0404* (2013.01); *H01M 2/0408* (2013.01); *H01M 2/1022* (2013.01); *H01M 2/204* (2013.01); *H01M 2/30* (2013.01); *H01M 10/044* (2013.01); *H01M 10/0436* (2013.01); *H01M 2220/30* (2013.01)

(58) Field of Classification Search
CPC .......... H01M 2/06; H01M 2/30; H01M 2/204; H01M 2/1022; H01M 10/0436; H01M 2/0404; H01M 2220/30
See application file for complete search history.

(56) References Cited

U.S. PATENT DOCUMENTS

| | | | |
|---|---|---|---|
| 10,044,009 B2 * | 8/2018 | Fallourd | H01M 2/06 |
| 2013/0164607 A1 | 6/2013 | Shih et al. | |
| 2016/0028048 A1 | 1/2016 | Lee et al. | |
| 2017/0018810 A1 | 1/2017 | Ladroue et al. | |
| 2017/0346097 A1 | 11/2017 | Andry et al. | |
| 2018/0020548 A1 | 1/2018 | Kapusta et al. | |

* cited by examiner

*Primary Examiner* — Stewart A Fraser
(74) *Attorney, Agent, or Firm* — Crowe & Dunlevy

(57) ABSTRACT

Disclosed herein is an electronic device including a substrate, with an active layer stack on the substrate. A cover is on the active layer stack and has a surface area greater than that of the active layer so as to encapsulate the active layer stack. A conductive pad layer is on the cover. At least one conductive via extends between the active layer stack and the conductive pad layer.

18 Claims, 4 Drawing Sheets

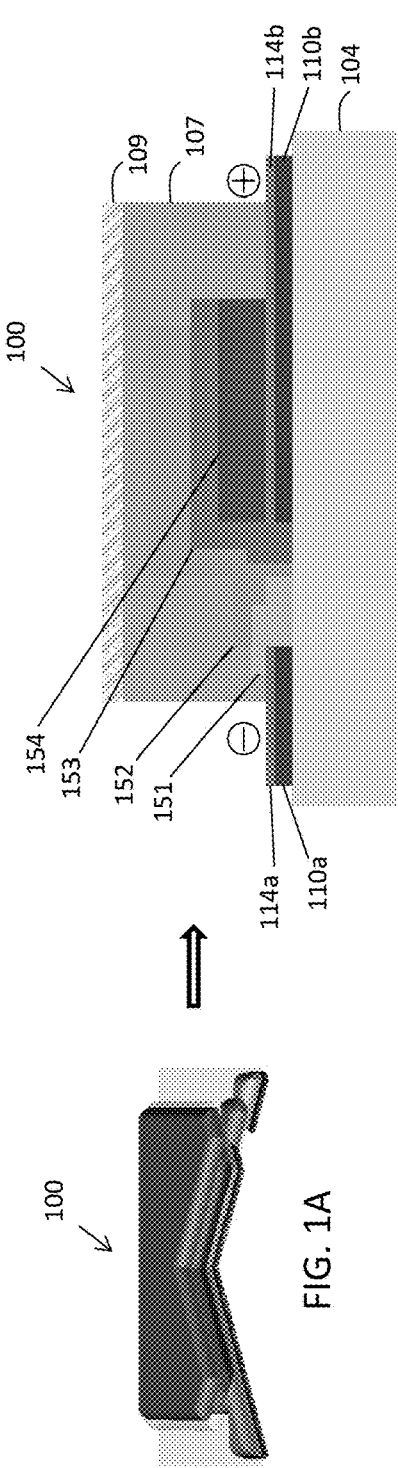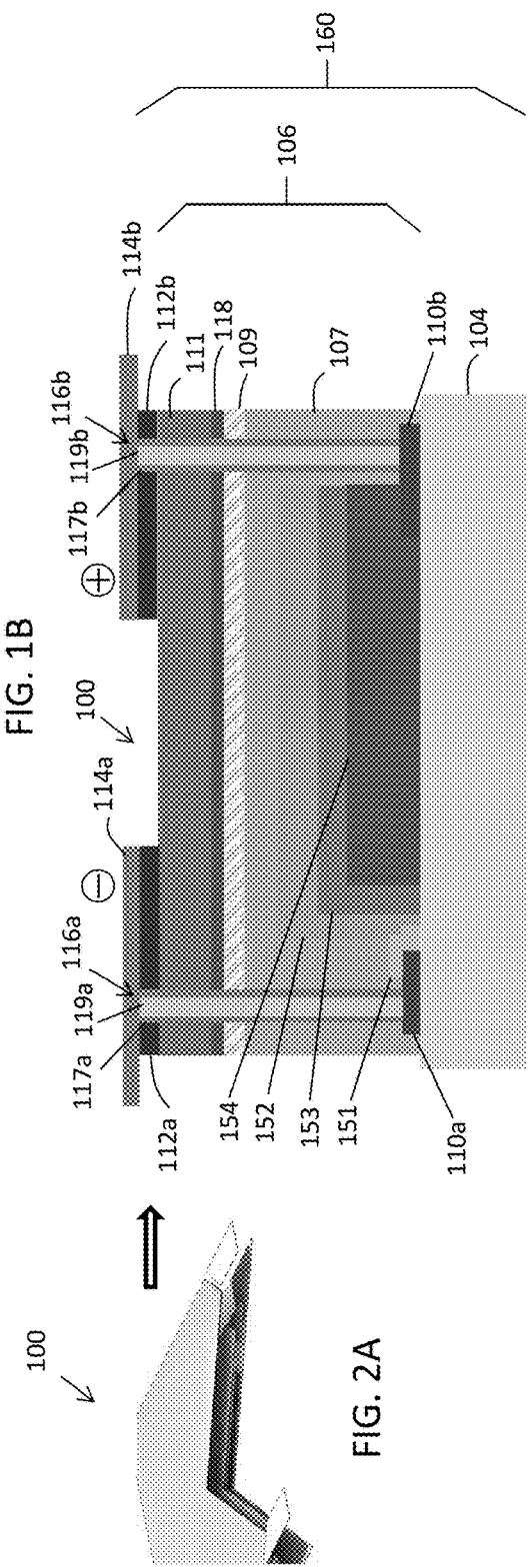

ENCAPSULATED MICROBATTERY HAVING TERMINAL CONNECTED TO ACTIVE LAYER THROUGH A VIA

CROSS REFERENCE TO RELATED APPLICATION

This application is a continuation application from U.S. application for patent Ser. No. 15/260,008 filed Sep. 8, 2016, the disclosure of which is incorporated by reference.

TECHNICAL FIELD

This disclosure is related to the field of microbatteries, and more particularly, to new method and layouts for use in encapsulating and packaging microbatteries.

BACKGROUND

Lithium microbatteries includes reactive elements, in particular an anode which is typically formed from lithiated components. Metal lithium reacts rapidly to exposure to atmospheric elements such as oxygen, nitrogen or water vapor, which could result in accelerated aging of the microbattery. Consequently, protection of the reactive elements is utilized.

Microbatteries are thus typically provided with a protection envelope that is sufficiently tight with respect to the atmosphere and compatible with the layers used in the microbattery to prevent leakage. However, so that the microbattery can make electrical contact with other electronic components, contact or battery terminal pads are present on a surface of the microbattery. The integrity of the protection envelope about the contact or battery terminal pads may be compromised in conventional designs, permitting an undesirable amount of environmental contact with the reactive elements of the battery. Also, such conventional designs typically consume an undesirable amount of surface area so as to make space for the contact or battery terminal pads.

New designs of microbatteries are therefore desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is an electronic device including a substrate, with an active layer stack on the substrate. A cover is on the active layer stack and has a surface area greater than that of the active layer stack so as to encapsulate the active layer stack. A conductive pad layer is on the cover. At least one conductive via extends between the active layer stack and the conductive pad layer.

The at least one conductive via may be a plurality of conductive microvias extending between the active layer stack and the conductive pad layer. A diameter of each of the plurality of microvias may be less than 200 μm. A first adhesive layer is on the active layer stack, and the cover includes a metal layer on the first adhesive layer, a second adhesive layer on the metal layer, and an insulative layer on the second adhesive layer.

A third adhesive layer is on the insulative layer, and the conductive pad layer includes at least one conductive pad on the third adhesive layer and electrically coupled to the at least one conductive via.

The at least one conductive via includes an outer insulating layer extending between the active layer stack and the conductive pad layer, and an inner conductive layer within the outer insulating layer and extending between the active layer stack and the conductive pad layer.

Another aspect is directed to an electronic device that includes a first battery structure. The first battery structure includes a substrate, with an active layer stack on the substrate and having at least one electrode area. A cover is on the active layer stack and has a surface area greater than that of the active layer stack so as to encapsulate the active layer stack. A conductive pad layer is on the cover. At least one conductive via extends between the at least one electrode area of the active layer stack and the conductive pad layer. A second battery structure is stacked on the first battery structure and includes a substrate, and an active layer stack on the substrate and having at least one electrode area. At least one interstack conductive via extends between the conductive pad layer of the first battery structure and the at least one electrode area of second battery structure. A cover is on the active layer stack and has a surface area greater than that of the active layer stack so as to encapsulate the active layer stack. A conductive pad layer is on the cover. At least one conductive via extends between the at least one electrode area of the active layer stack and the conductive pad layer. An interstack insulating layer is between the first battery structure and the second battery structure.

The at least one conductive via of the second battery structure may be a plurality of conductive microvias extending between the at least one electrode area of the active layer stack of the second battery structure and the conductive pad layer of the second battery structure.

The second battery structure includes a first adhesive layer on its active layer stack, and the cover of the second battery structure includes a metal layer on the first adhesive layer of the second battery structure, a second adhesive layer on the metal layer, and an insulative layer on the second adhesive layer of the second battery structure.

The second battery structure also includes a third adhesive layer on its insulative layer, and the conductive pad layer of the second battery structure includes at least one conductive pad on the third adhesive layer of the second battery structure.

The at least one conductive via of the second battery structure includes an outer insulating layer extending between the at least one electrode area of the active layer stack of the second battery structure and the conductive pad layer of the second battery structure, and an inner conductive layer within the outer insulating layer of the second battery structure and extending between the at least one electrode area of the active layer stack and the conductive pad layer of the second battery structure.

A further aspect is directed to an electronic device that includes a first battery structure. The first battery structure includes a substrate, with an active layer stack on the substrate and having at least one electrode area. A cover is on the active layer stack and has a surface area greater than that of the active layer stack so as to encapsulate the active layer stack. There is a conductive pad layer on the cover. At least one conductive via extends between the at least one electrode area of the active layer stack and the conductive pad layer. A second battery structure is stacked on the first battery structure and includes a substrate, with an active layer stack on the substrate and having at least one electrode area.

A cover is on the active layer stack and has a surface area greater than that of the active layer stack so as to encapsulate the active layer stack. A conductive pad layer is on the cover. At least one conductive via extends between the at least one electrode area of the active layer stack and the conductive pad layer. There is an interstack insulating layer between the first battery structure and the second battery structure. The first battery structure and second battery structure are arranged such that the conductive pad layer of the first battery structure faces the conductive pad layer of the second battery structure. A terminal layer is between, and electrically coupled to, the conductive pad layer of the first battery structure and the conductive pad layer of the second battery structure.

The at least one conductive via of the second battery structure may be a plurality of conductive microvias extending between the at least one electrode area of the active layer stack of the second battery structure and the conductive pad layer of the second battery structure. The second battery structure includes a first adhesive layer on its active layer stack, and the cover of the second battery structure has a metal layer on the first adhesive layer of the second battery structure, a second adhesive layer on the metal layer, and an insulative layer on the second adhesive layer of the second battery structure.

The second battery structure further has a third adhesive layer on its insulative layer, and the conductive pad layer of the second battery structure includes at least one conductive pad on the third adhesive layer of the second battery structure.

The at least one conductive via of the second battery structure includes an outer insulating layer extending between the at least one electrode area of the active layer stack of the second battery structure and the conductive pad layer of the second battery structure, and an inner conductive layer within the outer insulating layer of the second battery structure and extending between the at least one electrode area of the active layer stack and the conductive pad layer of the second battery structure.

A method aspect includes forming a battery structure by disposing an active layer stack having at least one electrode area on a substrate, encapsulating the active layer stack with a cover having a surface area greater than that of the active layer stack, and forming at least one conductive via through the cover to electrically couple to the at least one electrode area of the active layer stack. A conductive pad layer is formed on the cover and electrically coupled to the at least one conductive via.

Encapsulating the active layer stack with the cover includes applying a pre-formed cover stack to the active layer stack using a roller. The pre-formed cover stack includes a first adhesive layer to be disposed on the active layer stack, a metal layer on the first adhesive layer, a second adhesive layer on the metal layer, and an insulative layer on the second adhesive layer.

Forming the conductive pad layer on the cover includes applying a conductive glue to the cover adjacent the at least one conductive via, and attaching the conductive pad layer to the cover by positioning the conductive pad layer to contact the glue.

Forming the at least one conductive via may be include a plurality conductive microvias through the cover to electrically couple to the at least one electrode area of the active layer stack. In addition, forming the plurality of microvias may include laser drilling a plurality of passageways having a diameter of less than 200 μm through the cover to contact the at least one electrode area of the active layer stack, forming an outer insulating layer within the plurality of passageways, and forming an inner conductive layer within the outer insulating layer.

An interstack insulating layer may be disposed on the battery structure, and an additional battery structure may be formed on the battery structure. This may be performed by placing a substrate on the battery structure, forming at least one interstack conductive through the substrate of the additional battery structure to electrically couple to the conductive pad layer of the battery structure, disposing an active layer stack having at least one electrode area on the substrate of the additional battery structure and electrically coupled to the at least one interstack conductive via, and encapsulating the active layer stack of the additional battery structure with a cover having a surface area greater than that of the active layer stack of the additional battery structure. At least one conductive via may be formed through the cover of the additional battery structure to electrically couple to the at least one electrode area of the active layer stack of the additional battery structure. A conductive pad layer may be formed on the cover of the additional battery structure and electrically coupled to the at least one conductive via of the additional battery structure.

Encapsulating the active layer stack of the additional battery structure with the cover may include applying a pre-formed cover stack to the active layer stack of the additional battery structure using a roller, with the pre-formed cover stack including a first adhesive layer to be disposed on the active layer stack of the additional battery structure, a metal layer on that first adhesive layer, a second adhesive layer on that metal layer, and an insulative layer on that second adhesive layer.

Forming the conductive pad layer on the cover of the additional battery structure may include applying a conductive glue to the cover of the additional battery structure adjacent the at least one conductive via, and attaching the conductive pad layer to that cover by positioning the conductive pad layer of the additional battery structure to contact the glue.

Forming the at least one conductive via of the additional battery structure may include forming a plurality conductive microvias through the cover of the additional battery structure to electrically couple to the at least one electrode area of the active layer stack of the additional battery structure.

Forming the plurality of microvias of the additional battery structure may include laser drilling a plurality of passageways having a diameter of less than 200 μm through the cover of the additional battery structure to contact the at least one electrode area of the active layer stack of the additional battery structure. An outer insulating layer may be formed within the plurality of passageways of the additional battery structure, an inner conductive layer may be formed within the outer insulating layer of the additional battery structure.

BRIEF DESCRIPTION OF THE DRAWINGS

FIG. 1A is an exploded cutaway view of a portion of an encapsulated microbattery package in accordance with this disclosure.

FIG. 1B is a cross sectional view of the encapsulated microbattery of FIG. 1A cut along the line of the cutaway portion of FIG. 1A.

FIG. 2A is an exploded cutaway view of a portion of an encapsulated microbattery package in accordance with this disclosure.

FIG. 2B is a cross sectional view of the encapsulated microbattery of FIG. 2A cut along the line of the cutaway portion of FIG. 2A.

DETAILED DESCRIPTION

Figure 3:
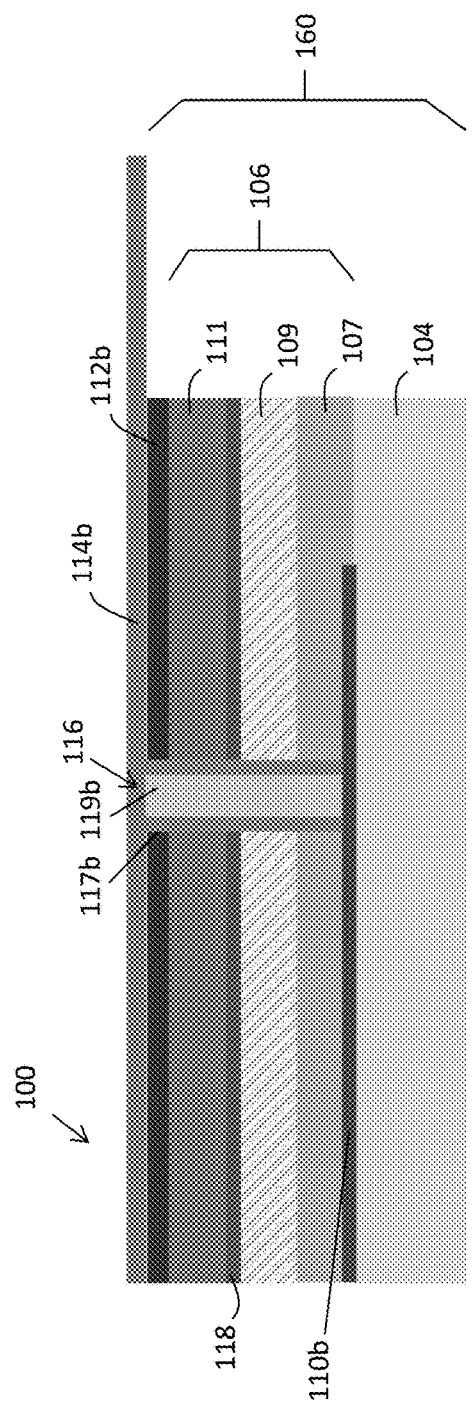
FIG. 3 is an enlarged cross sectional view of a portion of an encapsulated microbattery package in accordance with this disclosure.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout, and reference numbers separated by century, as well as reference numbers with prime notation, may indicate similar elements in other applications or embodiments.

With initial reference to FIGS. 1A-1B, a microbattery 100 is now described. The microbattery 100 includes a substrate 104, with an active layer stack (comprised of a cathode 154, an electrolyte layer 153 on the cathode layer 154, and an anode 152 on the electrolyte layer 153) on the substrate 104. A negative electrode 110a is coupled through a connecting layer 151 to the anode, and a positive electrode 110b is coupled to the cathode 154. Pads 114a and 114b are respectively stacked on the negative electrode 110a and positive electrode 110b. An encapsulating layer 107 encapsulates the active layer stack and seals against environmental contaminants. A metal layer 109 is on the encapsulating layer 107. As can be seen, however, the placement of the electrodes 110a and 110b on the substrate 104 itself serves to consume surface area of the substrate 104.

Therefore, so as to free up substrate 104 surface area that can be used, for example, to increase the size of the cathode 154, electrolyte layer 153, and anode 152, other designs have been devised.

With additional reference to FIGS. 2A-2B, and 3 a new design microbattery 100 is now described. The microbattery 100 includes a substrate 104. An active layer stack (comprised of a cathode 154, an electrolyte layer 153 on the cathode layer 154, and an anode 152 on the electrolyte layer 153) is formed on the substrate 104, and serves to store power. A barrier adhesive layer 107 covers and encapsulates the active layer stack and seals against the substrate 104 to prevent against environmental ingress. It can be seen that the surface area of the barrier adhesive layer 107 exceeds the surface area of the active layer stack to provide for the encapsulation.

A metal layer 109 is attached to the barrier adhesive layer 107 and serves to provide rigidity to the microbattery 100 and provide further protection to the active layer stack. A glue or adhesive layer 118 is on the metal layer 109, and an insulative layer 111 is on the adhesive layer 118. The barrier adhesive layer 107, metal layer 109, adhesive layer 118, and insulative layer 111 may be collectively referred to as a cap. A conductive glue or adhesive layer 112a, 112b is on the insulative layer 111, and conductive pads 114a and 114b are attached to the adhesive layer 112a, 112b.

A conductive via 116a extends from the electrode 110a to the conductive pad 114a, through the intervening layers; similarly, a conductive via 116b extends from the electrode 110b to the conductive pad 114b, through the intervening layers. The conductive via 116a is comprised of an outer insulating layer 112a and an inner conductive layer 119a, both extending along the entirely length of the conductive via 116a; similarly, the conductive via 116b is comprised of an outer insulating layer 112b and an inner conductive layer 119b, both extending along the entirely length of the conductive via 116b. Although one conductive via 116a or 116b is shown coupled to each of the electrodes 110a and 110b for simplicity, there may be multiple such conductive vias, and they may be microsized. That is, each of the conductive vias 116a, 116b, and those not shown may have a diameter of less than 200 μm, or less than 100 μm.

The base substrate 104 may be formed from silicon, and may have a thickness of 50 μm, for example. The metal layer 109 may be aluminum, and has a thickness less than that of the base substrate 104, such as 20 μm. The insulative layer 111 may be polyethylene terephthalate, known as PET.

The substrate 104, cathode 154, electrolyte layer 153, anode 152, barrier adhesive layer 107, metal layer 109, adhesive layer 118, insulative layer 111, and adhesive layer 112a, 112b may collectively be referred to as a battery structure 160. As will be described with additional reference to FIG. 4, a microbattery 200 may contain multiple battery structures 160, 260, 360.

Figure 4:
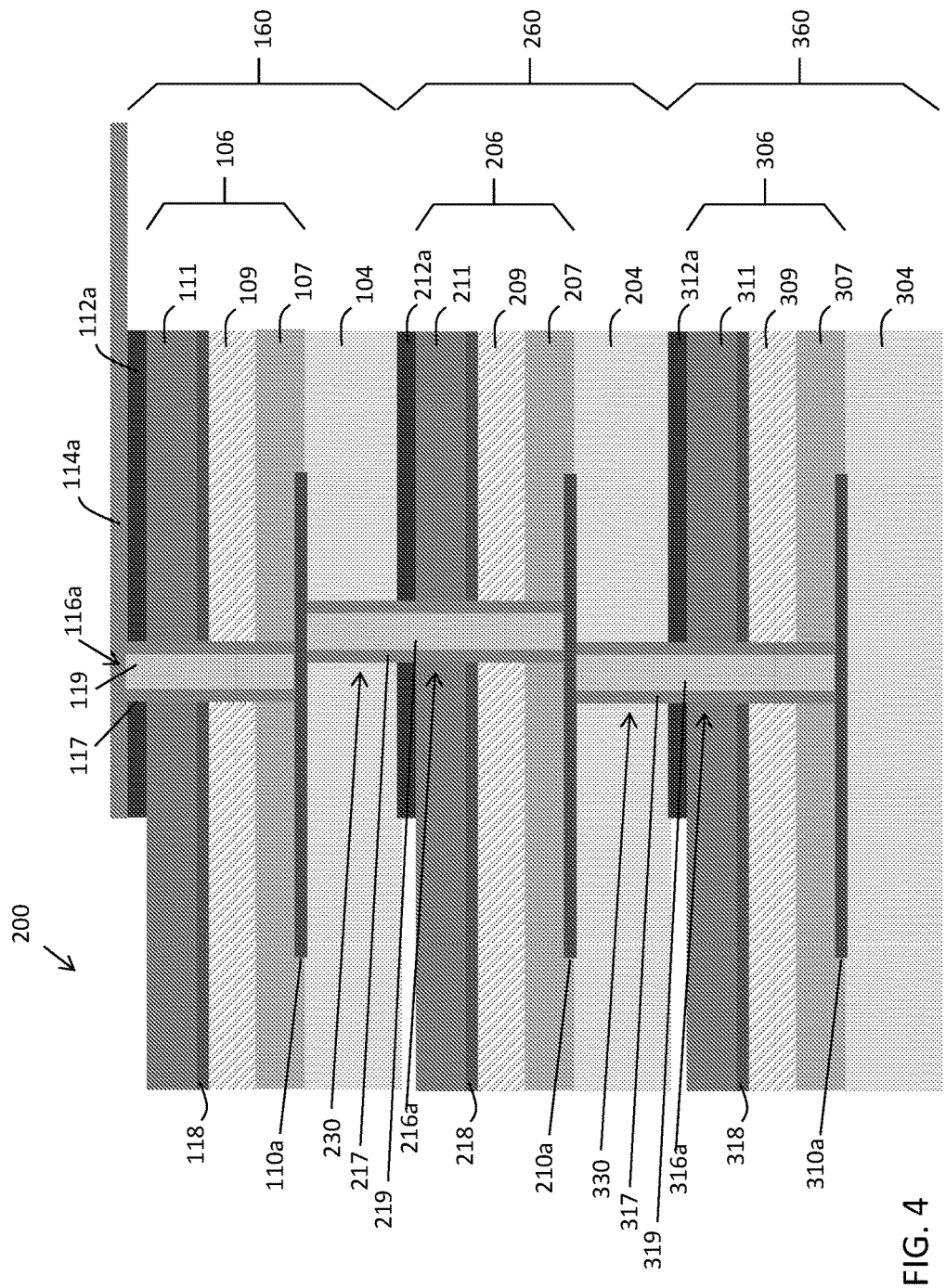
FIG. 4 is an enlarged cross sectional view of a portion of an encapsulated stacked microbattery package in which two battery structures are arranged bottom face to top face, in accordance with this disclosure.

In the embodiment shown in FIG. 4, the battery structure 360 serves as the base battery structure, and the battery structure 160 serves as the top battery structure. By top battery structure, it is meant that the conductive pad 114a is mechanically and electrically coupled to the adhesive layer 112a, and not the adhesive layers 212a, 312a of the battery structures 260, 360.

In greater detail, the battery structure 360 is substantially as described above, and includes a substrate 304, with an electrode 310a thereon. A barrier adhesive layer 307, metal layer 309, adhesive layer 318, and insulative layer 311 in a stacked arrangement act as a cap for the electrode 310a, encapsulating it and warding against environmental ingress. An adhesive layer 312a is on the insulative layer 311. At least one conductive via 316a extends from the electrode 310a to the adhesive layer 312a.

The battery structure 260 is stacked on the battery structure 360. In greater detail, the battery structure 260 is substantially as described above, and includes a substrate 204, with an electrode 210a thereon. A barrier adhesive layer 207, metal layer 209, adhesive layer 218, and insulative layer 211 in a stacked arrangement act as a cap for the electrode 210a, encapsulating it and warding against environmental ingress. An adhesive layer 212a is on the insulative layer 211. At least one conductive via 216a extends from the collector of the electrode 210a to the adhesive layer 212a. At least one interstack conductive via 330 electrically couples the electrode 210a to the adhesive layer 312a.

The battery structure 160 is stacked on the battery structure 260 and is substantially as described above, but with the addition of at least one interstack conductive via 230 electrically coupling the electrode 110a to the adhesive layer 212a.

Although pairs of conductive vias are shown for simplicity, there may be many such conductive vias, and they may be microsized, each having a diameter of less than 200 µm, or less than 100 µm. Similarly, although one interstack conductive via 230, 330 is shown, there may be multiple such conductive vias, and they may be microsized, each having a diameter of less than 200 µm, or less than 100 µm.

The stacking of the battery structures 160, 260, 360 can provide for an increased voltage output while maintaining a compact footprint.

A different stacked arrangement of multiple battery structures 160, 260 to form a microbattery 300 is now described with reference to FIG. 5. Here, rather than the battery structure 160 acting as a top battery structure carrying the conductive pad 114a on a top side thereof, the battery structures 160, 260 are arranged so as to face one another, and the conductive pad 114a extends from an interface therebetween.

The battery structure 160, described from bottom up, includes a substrate 104, with an electrode 110a thereon. A barrier adhesive layer 107, metal layer 109, adhesive layer 118, and insulative layer 111 in a stacked arrangement act as a cap for the electrode 110a, encapsulating it and warding against environmental ingress. An adhesive layer 112a is on the insulative layer 111. At least one conductive via 116a extends from the electrode 210a to the adhesive layer 212a.

The battery structure 260, described from the top down, includes a substrate 204, with an electrode 210a thereon. A barrier adhesive layer 207, metal layer 209, adhesive layer 218, and insulative layer 211 in a stacked arrangement act as a cap for the electrode 210a, encapsulating it and warding against environmental ingress. An adhesive layer 212a is on the insulative layer 211. At least one conductive via 216a extends from the collector of the electrode 210a to the adhesive layer 212a. The conductive pad 114a is mechanically and electrically coupled to the adhesive layers 112a and 212a.

Although pairs of conductive vias are shown for simplicity, there may be multiple such conductive vias, and they may be microsized, each having a diameter of less than 200 µm, or less than 100 µm.

Referring again to FIGS. 2A-2B, a method of making the microbattery 100 is now described. The battery structure 160 is formed by disposing the electrodes 110a and 110b on the substrate 104, disposing the connecting layer 151 on the substrate 104 and electrode 110a, forming or placing the cathode 154 on the substrate 104 and electrode 110b, forming or placing the electrolyte later 153 on the substrate 104 and cathode 154, and forming or placing the anode 152 on the electrolyte layer 153 and connecting layer 151. The cap 106 is then placed. The cap 106, as described above, includes the barrier adhesive layer 107, metal layer 109, adhesive layer 118, and insulative layer 111 in a stacked and pre-formed arrangement. The cap 106 is applied via a roller so as to effectuate the encapsulation.

The adhesive or glue layer 112a, 112b is applied to the insulative layer 111. Conductive vias 116a and 116b is formed within the battery structure 160 so as to extend from the electrodes 110a and 110b to the adhesive layer 112a, 112b. This formation may be performed via laser drilling of passageways in the battery structure 160, material deposition of the outer insulating layers 117a and 117b into the passageways, and material deposition or electroplating of the inner conductive layers 119a and 119b. This may be produced any number of times to produce any number of conductive vias 116a, 116b, which may be microsized as described above. The conductive pads 114a and 114b are mechanically and electrically coupled to the conductive vias 116a and 116b through placement on the adhesive layer 112a, 112b.

Figure 5:
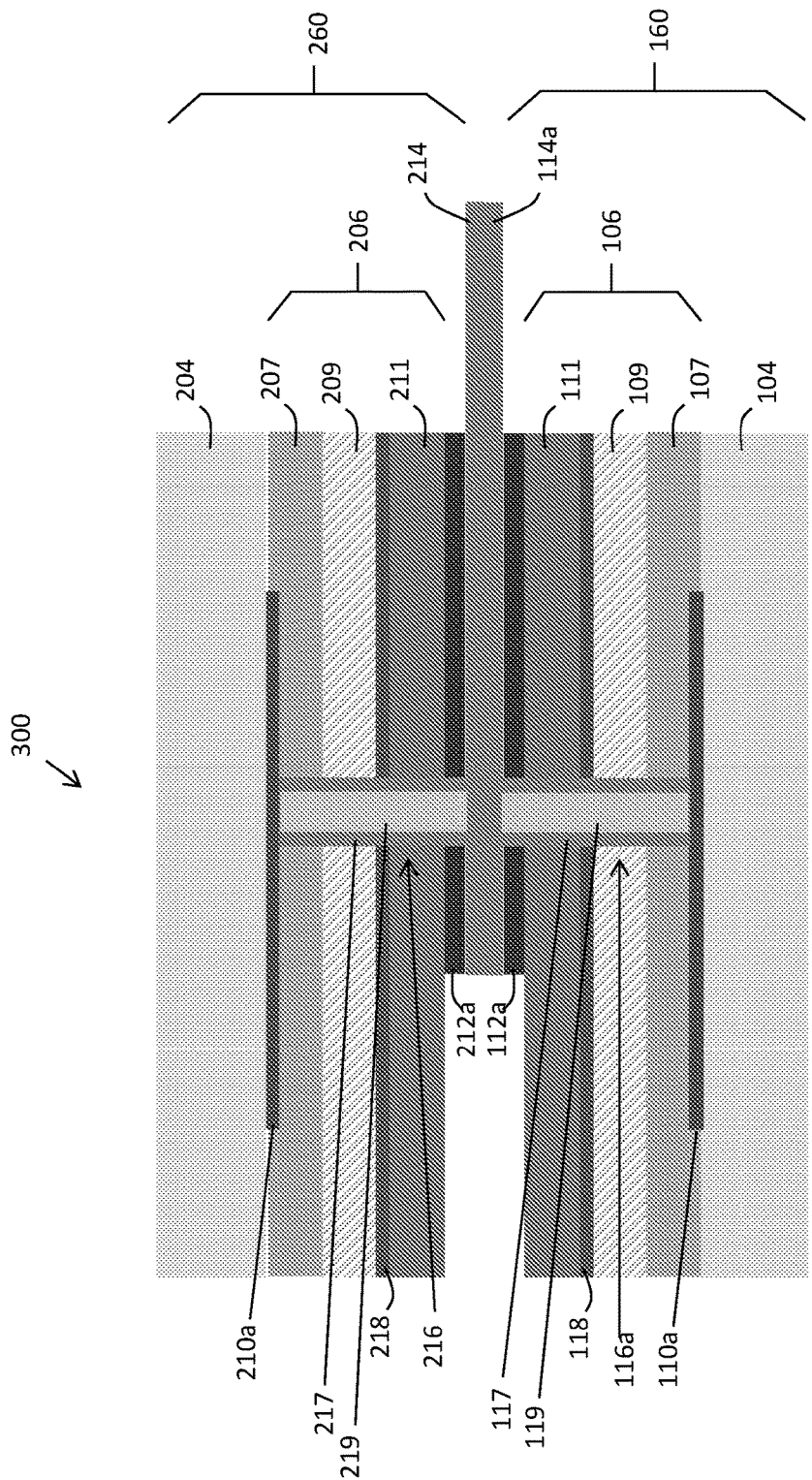
FIG. 5 is an enlarged cross sectional view of a portion of an encapsulated stacked microbattery package in which two battery structures are arranged top face to top face, in accordance with this disclosure.

These formation methods may be repeated so as to form the microbatteries 200, 300 shown in FIGS. 4-5.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
   a first battery structure comprising:
      a first substrate; and
      a first active layer stack on the first substrate; and
   a second battery structure comprising:
      a second active layer stack;
   an interstack insulating layer between the first battery structure and the second battery structure; and
   at least one interstack conductive via extending from the first active layer stack through the first substrate and through the interstack insulating layer to the second active layer stack.

2. The electronic device of claim 1, wherein the at least one interstack conductive via comprises an outer insulating layer extending between the first active layer stack and the second active layer stack.

3. The electronic device of claim 1, wherein the at least one interstack conductive via comprises a plurality of conductive microvias.

4. The electronic device of claim 3, wherein a diameter of each of the plurality of conductive microvias is less than 200 µm.

5. The electronic device of claim 1, wherein the second battery structure further comprises a first adhesive layer on the second active layer stack, a metal layer on the first adhesive layer, and a second adhesive layer on the metal layer.

6. The electronic device of claim 1, further comprising an encapsulating cover over the first active layer stack, wherein the encapsulating cover has a surface area greater than a surface area of the first active layer stack.

7. The electronic device of claim 6, wherein the encapsulating cover comprises a pre-formed cover stack.

8. An electronic device, comprising:
   a first battery structure comprising:
      a first substrate;
      a first active layer stack on the first substrate and having at least one first electrode area;
      a cover on the first active layer stack and having a surface area greater than a surface area of the first active layer stack so as to encapsulate the first active layer stack;
      a first conductive pad layer on the cover; and
      at least one first conductive via extending between the at least one first electrode area of the first active layer stack and the first conductive pad layer.

9. The electronic device of claim 8, further comprising:
a second battery structure stacked on the first battery structure and comprising:
a second active layer stack having at least one second electrode area; and
at least one second conductive via extending between the at least one second electrode area and the at least one first electrode area.

10. The electronic device of claim 9, wherein the at least one second conductive via comprises a plurality of microvias extending between the at least one second electrode area and the at least one first electrode area.

11. The electronic device of claim 10, wherein each of the plurality of microvias comprises:
a plurality of passageways;
an outer insulating layer within the plurality of passageways; and
an inner conductive layer within the outer insulating layer.

12. The electronic device of claim 10, wherein each of the plurality of microvias has a diameter of less than 200 μm.

13. The electronic device of claim 9, wherein the at least one second conductive via of the second battery structure comprises an outer insulating layer extending between the at least one second electrode area and the at least one first electrode area, and an inner conductive layer within the outer insulating layer of the second battery structure and extending between the at least one second electrode area and the at least one first electrode area.

14. The electronic device of claim 9, further comprising:
a third battery structure stacked on the second battery structure and comprising:
a third active layer stack having at least one third electrode area; and
at least one third conductive via extending between the at least one third electrode area and the at least one second electrode area.

15. The electronic device of claim 14, wherein the at least one third conductive via of the third battery structure comprises a plurality of microvias extending between the at least one third electrode area and the at least one second electrode area.

16. The electronic device of claim 15, wherein each of the plurality of microvias comprises:
a plurality of passageways;
an outer insulating layer within the plurality of passageways; and
an inner conductive layer within the outer insulating layer.

17. The electronic device of claim 15, wherein each of the plurality of microvias has a diameter of less than 200 μm.

18. The electronic device of claim 14, wherein the at least one third conductive via of the third battery structure comprises an outer insulating layer extending between the at least one third electrode area and the at least one second electrode area, and an inner conductive layer within the outer insulating layer.

* * * * *